April 15, 1969     T. J. SALMONS     3,439,358
ACTIVITY DETECTORS

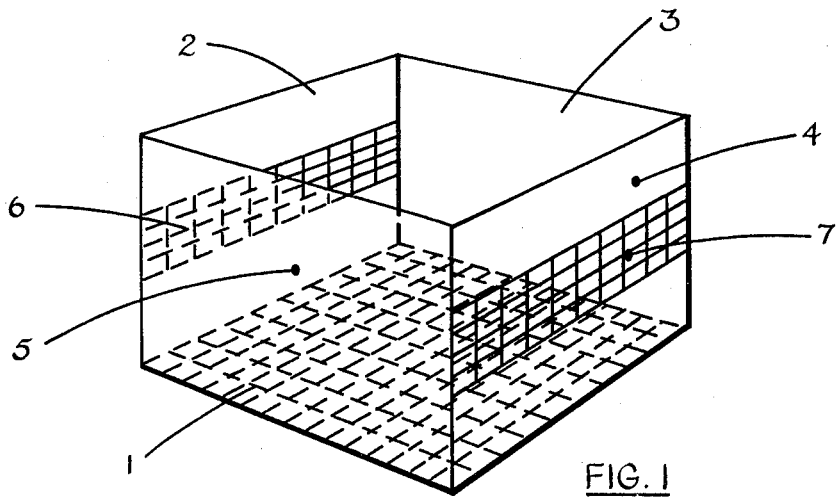
FIG. 1
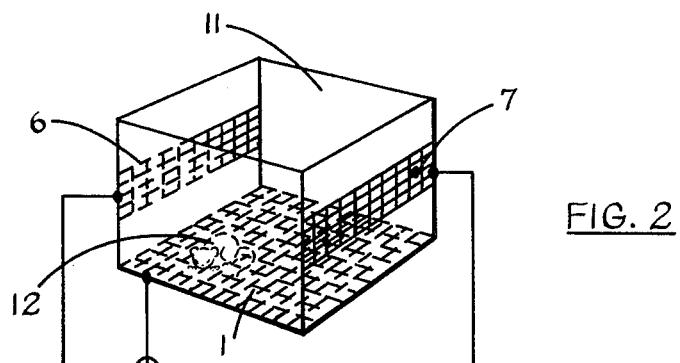
FIG. 2
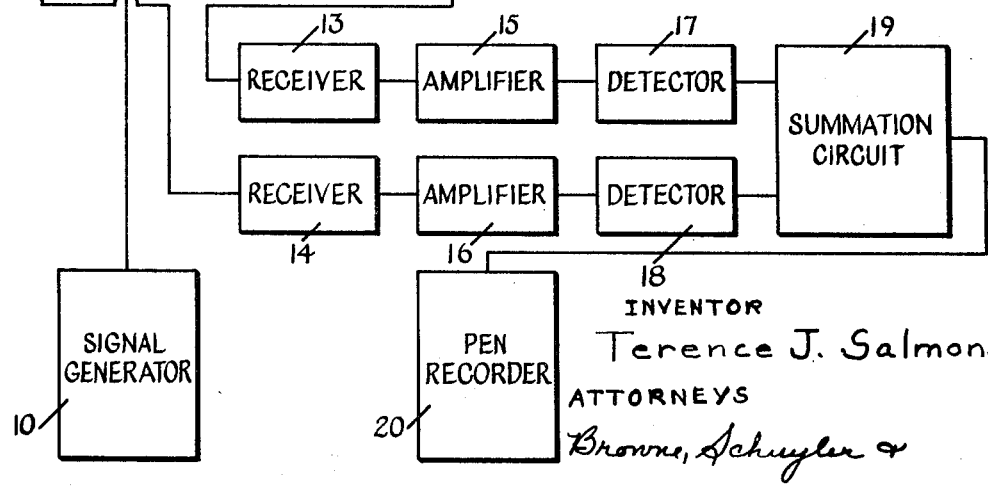

Filed Nov. 30, 1965     Sheet 2 of 4

INVENTOR
Terence J. Salmons
ATTORNEYS
Browne, Schuyler & Beveridge

United States Patent Office 3,439,358
Patented Apr. 15, 1969

3,439,358
ACTIVITY DETECTORS
Terence J. Salmons, Cambridge, England, assignor, by mesne assignments, to George Washington Limited, a corporation of Great Britain
Filed Nov. 30, 1965, Ser. No. 510,488
Int. Cl. G08b 13/22
U.S. Cl. 340—258        9 Claims

ABSTRACT OF THE DISCLOSURE

This invention relates to devices for detecting and recording movement of animals, both human and non human, within predetermined areas. In one embodiment, the animal itself serves as a source of high frequency radiation. A plurality of receiving antennas develop signals dependent upon their proximity to the animal. A second embodiment provides for the generation of high frequency signals in the area occupied by the animal. Receiving antennas again develop variable outputs, dependent upon movement of the animal in the area. Finally, provision is made for recording movement and counting the number of movements.

---

This invention relates to an improved method and apparatus for determining the activity or position, generally referred to as the movement of an animal or the like within a predetermined area or space. Such apparatus is already known but it is of a relatively crude nature in that the movement of an animal is indicated for example by the animal energising a micro-switch. Thus the accuracy in determining say the position of an animal is dependent upon the number of micro-switches contained within the enclosed space.

The present invention provides an apparatus for observing the movement of an animal within a predetermined area or space, said apparatus comprising a source of low voltage radio frequency signals, means for energising said animal with radio signals received from said source, at least one receiving antenna about said area or space and adapted to receive said radio frequency signals, and means for indicating variations in signal received in the said antenna depending on a change in position of the said animal within the area or space. The predetermined area or space may be a cage, or where the animal is human it may be a cot, bed or chair. In one construction of cage the upper and/or lower walls may be made electrically conductive and to which the high frequency signal may be applied to energise the animal whilst the side walls may be made electrically insulating and at least two side walls provided with electrically conductive areas acting as receiving antenna. In an alternative construction of a cage where it is only desired to measure activity or respiration rate of the animal, all the walls may be made electrically insulating with two of the side walls provided with electrically conductive areas, one to have the high frequency signal applied thereto, and the other to act as a receiving antennae. Where the predetermined areas is a metal framed cot, the side walls may have the frequency signal applied thereto and the receiving antenna or antennae may be implanted in a mattress provided in the cot. If the cot has a frame made of electrically insulating material the mattress besides supporting the receiving antennae may contain a further element to act as a radiator for the high frequency signal. Such a mattress may also be used on a bed to indicate the movements of a person lying thereon. When the predetermined area is a chair the high frequency may be radiated from a metal plate provided under the seat whilst the receiving antenna may be positioned either on or within the arms of the chair. The signal may be used to operate a pen recorder which will graphically record the position of the animal, or to energise an electromechanical counter to give a visual indication of the number of movements made by the animal.

Figure 3:
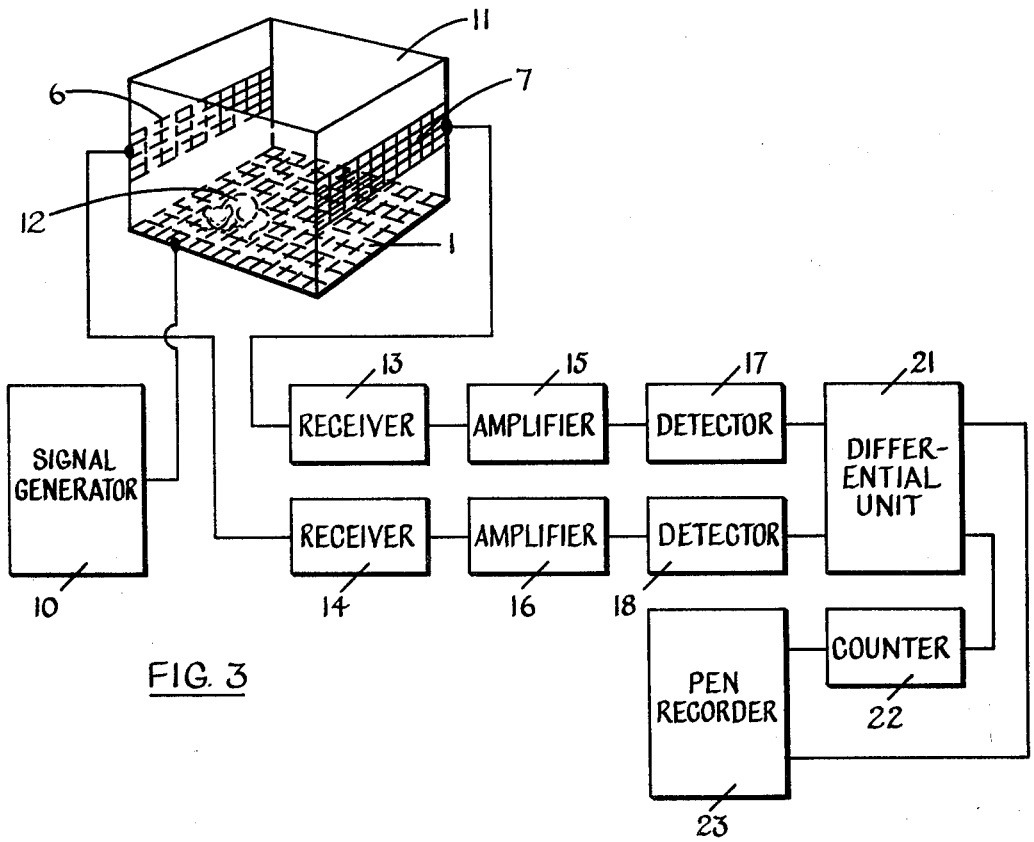
Figure 4:
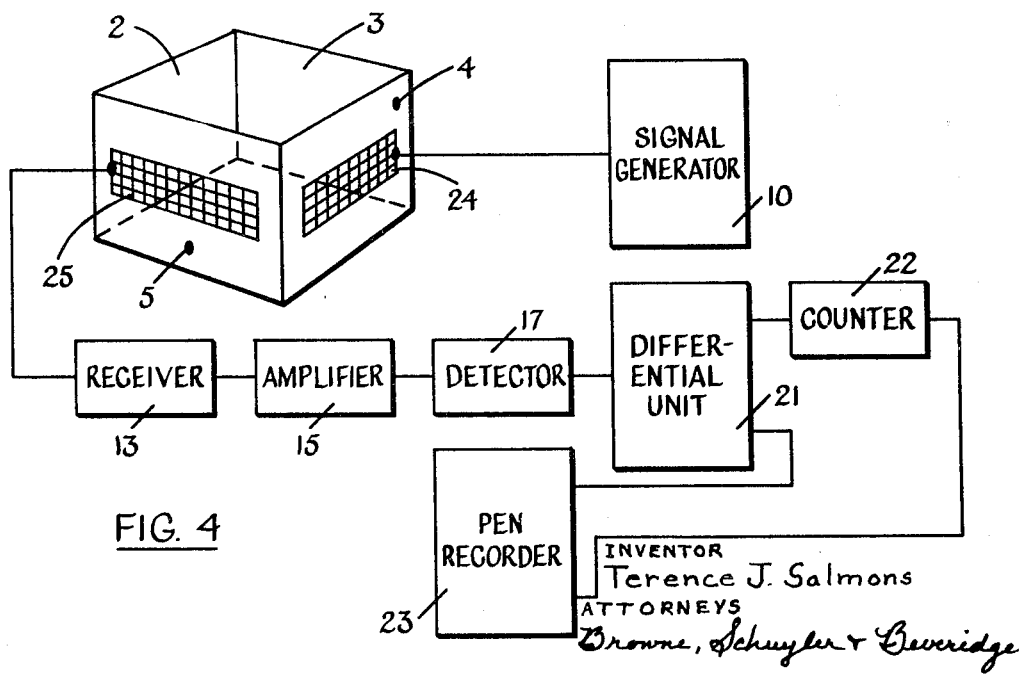
Figure 5:
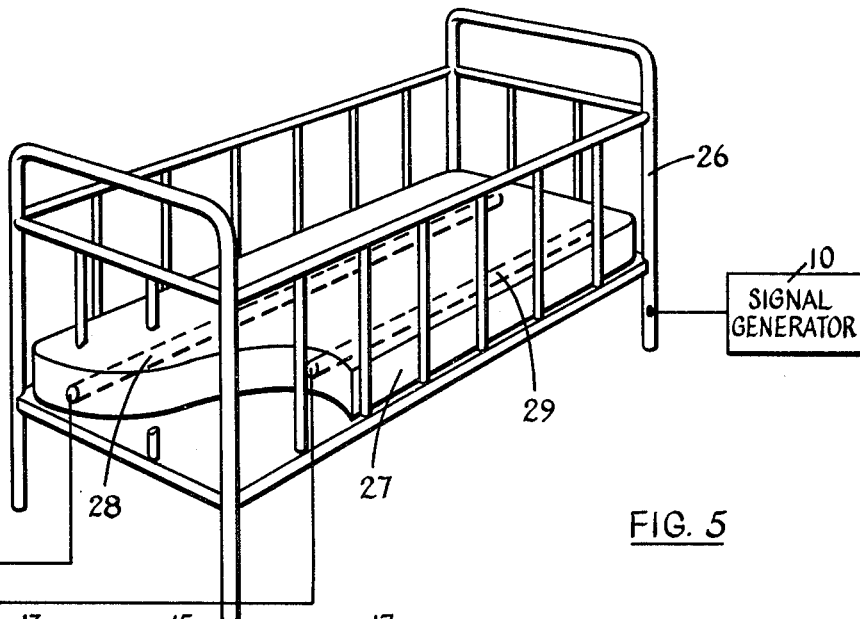
Figure 6:
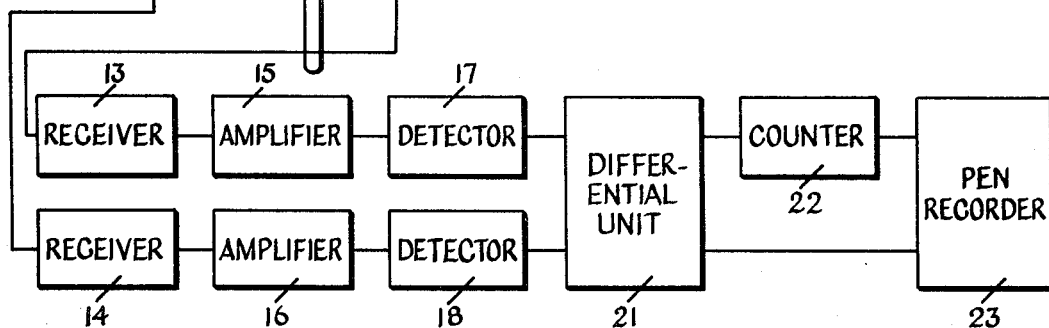
Figure 6:
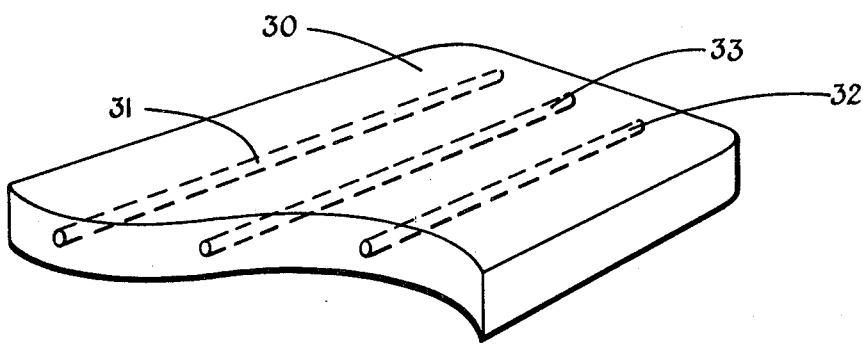
Figure 7:
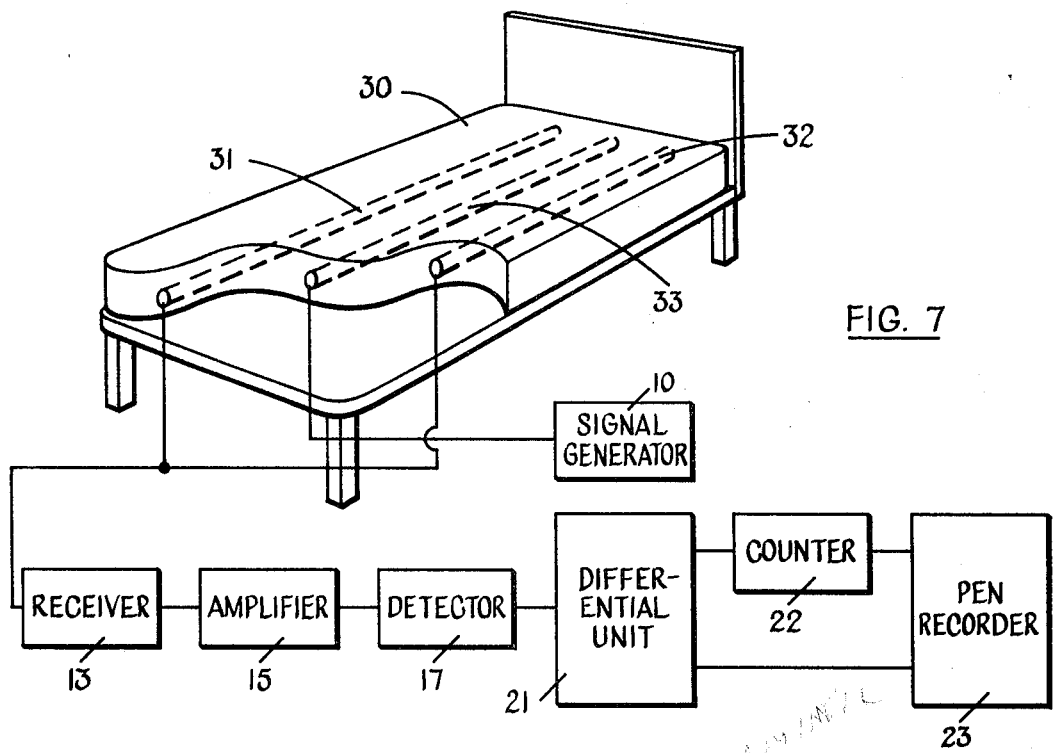
Figure 8:
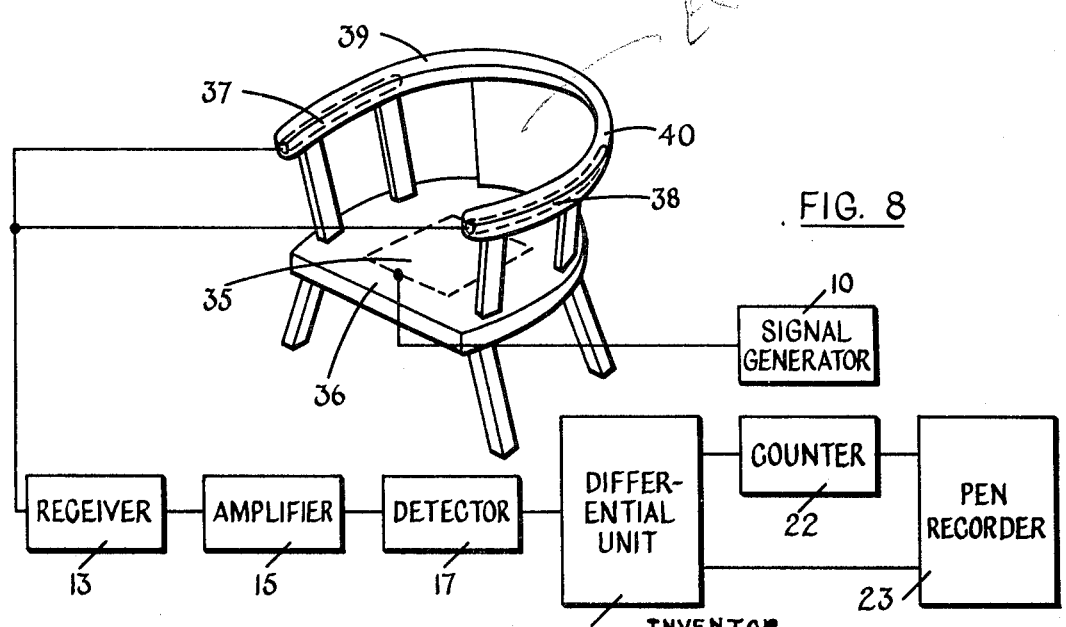

The above and other features of the invention will be more readily understood by a perusal of the following description having reference to the accompanying drawings in which FIGURE 1 is a perspective view of a cage employed in the apparatus according to the preesnt invention, FIGURE 2 is a diagram of apparatus according to the present invention employing the cage of FIGURE 1, FIGURE 3 is a diagram of apparatus according to the present invention also employing the cage of FIGURE 1, FIGURE 4 is a block diagram of apparatus according to the present invention employing a different cage to that shown in FIGURE 1, FIGURE 5 is a block diagram of apparatus according to the invention employing a cot, FIGURE 6 is a perspective view of a mattress, partly in section, employed with apparatus according to the present invention, FIGURE 7 is a diagram of apparatus according to the present invention employing the mattress of FIGURE 6 and FIGURE 8 is a diagram of apparatus according to the present invention employing a chair.

Referring to FIGURE 1, a cage comprises a lower wall or base 1 which is made of an electrically conductive grid or mesh, and sidewalls 2, 4 and 5 which are made of an electrically insulating material. The upper wall 3 may be made either electrically conductive or electrically insulating and has been omitted for the purpose of clarity, the side walls being shown transparent for the same reason. On each of two of the side walls 2 and 4, is provided a conductive strip 6 and 7 such as metal foil, which may conveniently be attached by means of a suitable adhesive.

The apparatus employed with the cage described above for indicating the position of an animal within the cage of FIGURE 1 is shown in block form in FIGURE 2. A small amplitude high frequency sine wave which may conveniently have a frequency of 80 kc./s. and an amplitude of 2-volts peak to peak is produced in a signal generator 10 and is fed to the top 3 and/or base 1 and also the upper wall 3 if this is made of electrically conducting material of the cage 11 which may house a small animal depicted at 12. The animal 12 being in contact with the base 1 thus becomes an additional radiator for the high frequency signal applied to the the base 1 and the high frequency signal will be received by the conductive strips or plates 6 and 7 which act as antennae. The amount of signal received by each antenna will be dependent upon the proximity of the animal to each antanna. Thus, if the animal is nearer to antenna 6 than antenna 7, a greater high frequency signal will be received by antenna 6 than antenna 7. The received signals are fed first to tuned receivers 13 and 14 which are capable of rejecting frequencies other than that produced by the signal generator 10, which are then amplified by amplifiers 15 and 16. The amplified signals are applied to detectors 17 and 18, detector 17 associated with antenna 7 detecting the positive excursions of the received signals whilst detector 18 associated with antenna 6 detects the negative excursions of the received signal. The detected signals are smoothed to produce positive and negative D.C. voltages respectively and applied to a summation circuit 19 to produce an output which may vary in a positive or negative manner about zero. This output is applied to a pen-recorder 20 employing a centre reading ammeter and the plot produced will thus be an indication of the position of the animal in the cage.

FIGURE 3 shows an alternative method of obtaining information from the cage and in this case the number of movements that the animal makes is also recorded. As in FIGURE 2, the base 1 of the cage is energised from the signal generator 10 and signals received by the two antennae 6 and 7 are again fed successively to receivers 13, 14, amplifiers 15, 16 and detectors 17, 18. The outputs from the two detectors are applied to a combined summation and differential unit 21 which has two outputs, one of which being from the summation portion of the unit is applied to the first channel of a pen recorder 23 to produce a plot which again is an indication of the position of the animal within the cage. The second output is from the differential portion of the unit 21 and this only produces a shaped output when the change in strength of the signals applied to the unit exceeds a given predetermined level, i.e. the animal moves more than a given amount. This shaped output is fed to an electromechanical counter 22 to indicate the total number of movements, and also to the second channel of pen recorder 23 to record each movement (by a stroke in one direction) and also to record every tenth movement (indicated by a stroke in the other direction).

In alternative arrangements to those described above the cage is not provided with a conductive base, or if it is so provided, the signal generator 10 is not directly connected to it, but to an alternative transmitting means. One such an arrangement is shown in FIGURE 4 where two adjacent side walls 4 and 5 are provided with conductive plates 24 and 25, though these could be positioned on opposite walls. The plate 24 is connected to the signal generator 10 whilst the plate 25, acting as a receiving antenna is connected to the receiver 13, amplifier 15, detector 17 and differential unit 21, counter 22 and pen recorder 23, only one receiving channel being employed in this arrangement. With arrangements such as this where the animal does not form part of the radiating element the presence of the animal decreases the amount of signal received by the antenna, in this arrangement antenna 25. This single channel system will not be able to give an indication of the position of the animal in the cage but will record the number of movements and activity of the animal due to changes in signal strength received by the antenna 25.

So far the present invention has been described with reference to a cage but it is not limited thereto as it may also be applied to a cot to record the movements of a baby or young child. Such an arrangement is shown in FIGURE 5 in which the cot 26 is of the metal framed type as employed in hospitals. The signal generator 10 is connected to the frame of the cot and the signals are partially absorbed by a baby (not shown) lying on a mattress 27. The mattress is provided with two metallic strips or wires 28 and 29 which are implanted in it and which act as receiving antennae to pick up signals of varying strength depending upon the position and movement of the baby in the cot although in this arrangement the signal strength picked up by an antenna decreases as the baby approaches that antenna. The signals are processed in a similar manner to that shown with respect to FIGURE 3 above to produce a numerical count of movement on the counter 22 and a graphical display of the count and position on the pen recorder 23.

Where the cot is not of the metal framed type but made of electrically insulating material such as wood it is not possible to radiate the signal from the cot frame. In such a case the cot may be provided with a mattress 30 as shown in FIG. 6. This mattress is provided with two implanted metallic conductors or wires 31 and 32 in a similar manner to those contained in mattress 25 shown in FIGURE 5 above, and which act as receiving antennae. Between these two conductors 31 and 32 is implanted a further metallic conductor or wire 33 and it is to this conductor that the signal generator will be connected whilst the two receiving antennae 31 and 32 are connected as before to the detection system. This type of mattress may also be employed on a bed and will be of especial use in hospitals when it is desired to observe the movements of a patient during a post operative period.

With a bed or cot employing a mattress of the type described with reference to FIGURE 6 and where it is desired only to measure the number of movements made rather than indicate the position that the child or person is in; the two receiving antennae 31 and 32 may be connected together and applied to a single channel receiving system as shown in FIGURE 7. This single channel receiving system will comprise receiver 13, amplifier 15, detector 17, differentiator 21, counter 22 and pen recorder 23. The output direct from the differentiator to the pen recorder will apply to one channel of the pen recorder a signal equivalent to variations in signal strength received by the antenna. This has been shown to be sensitive enough to show up the respiration rate of the child or person on the mattress.

In an alternative arrangement shown in FIGURE 8 where it is desired to observe the reaction of a person while sitting, a chair 34 is provided which is made substantially of electrically insulating material (i.e. wood) and which has a metallic plate 35 provided under the seat 36 to act as a radiator for the high frequency signal. The receiving antennae are formed by conductive strips or wires 37 and 38 positioned under or implanted within the arms 39 and 40. These two antennae may be connected together as were the antennae of FIGURE 7 and connected to the receiving equipment in the same manner, the signal generator 10 being connected to the radiating plate. Processing of the signals received by the antennae will be in a like manner to that disclosed with reference to FIGURE 4 with the two antennae connected together.

I claim:
1. In an apparatus for automatically detecting movement of an animal, human or non-human, within a predetermined space, the combination comprising,
    means for generating high frequency electrical signals,
    radiator means connected to receive said high frequency signals for transmitting said signals in said predetermined space,
    a plurality of spaced receiving means for receiving said transmitted signals,
    a plurality of electrical circuit means, a circuit connected to each of said receiving means for developing an output dependent upon the proximity of said animal to its associated receiving means,
    means connected to receive said circuit outputs for generating a signal corresponding to the sum of said signals,
    and recording means connected to receive said sum signal for graphically reproducing the detected movements of said animal.
2. The apparatus of claim 1, wherein said radiator means includes said animal.
3. The apparatus of claim 1, further comprising, means for generating a shaped output signal whenever any of said circuit outputs exceed a predetermined level,
    means for counting the number of shaped outputs,
    and, wherein said recording means includes means for recording the number of shaped outputs.
4. In an apparatus for observing the movements of an animal or person on a bed on which a mattress is provided, the combination comprising
    a signal generator producing radio frequency signals and connected to transmission means in near proximity to said bed,
    at least one receiving antenna spaced from said transmission means in near proximity to said bed,
    signal receiving and amplifying means connected to said receiving antenna,
    detecting means connected to said receiving and amplifying means for producing an output in response to said signals,
    and signal utilization means connected to receive the output of said detecting means for indicating variations in said detected output.
5. The apparatus of claim 4, in which said bed has a metal frame, said frame constituting said transmission means.

6. The apparatus of claim 5, in which a second receiving antenna is located in near proximity to said bed,
a second signal receiving and amplifying means connected to said second receiving antenna,
a second detecting means connected to said second receiving and amplifying means for producing an output in response to said signals,
the output of said second detecting means also being coupled to said signal utilization means.

7. The apparatus of claim 6 in which said detecting means produces an output of opposite polarity to that produced by said second detecting means.

8. The apparatus of claim 6, in which said signal utilization means also provides a reading which is a function of the instantaneous position of the animal.

9. The apparatus of claim 4, in which said transmission means is an antenna planted in said mattress.

References Cited

UNITED STATES PATENTS

| | | |
|---|---|---|
| 3,111,608 | 11/1963 | Boenning et al. |
| 3,177,481 | 4/1965 | Joy et al. _____ 340—279 |
| 3,237,105 | 2/1966 | Kalmus _____ 325—29 |
| 3,300,768 | 1/1967 | Bystrom et al. _____ 340—258 |
| 3,324,848 | 6/1967 | Domeier et al. _____ 128—2.08 |

FOREIGN PATENTS

| | | |
|---|---|---|
| 882,061 | 7/1953 | Germany. |
| 675,049 | 2/1930 | France. |
| 930,976 | 2/1948 | France. |

JOHN W. CALDWELL, *Primary Examiner.*

D. L. TRAFTON, *Assistant Examiner.*

U.S. Cl. X.R.

128—2.1